United States Patent [19]
Van Fleet, III

[11] Patent Number: 5,563,511
[45] Date of Patent: Oct. 8, 1996

[54] MAGNETIC SENSOR WITH PROTECTIVE CAP

[75] Inventor: Vern C. Van Fleet, III, Wolcott, Conn.

[73] Assignee: Echlin, Inc., Branford, Conn.

[21] Appl. No.: 435,792

[22] Filed: May 5, 1995

[51] Int. Cl.$^6$ .............................. G01P 1/02; G01P 3/488; G01B 7/30; H05K 5/00
[52] U.S. Cl. ..................... 324/174; 324/207.15; 336/92
[58] Field of Search ................. 324/207.15, 207.16, 324/207.22, 207.25, 173, 174; 336/90, 92, 98, 110, 221

[56] References Cited

U.S. PATENT DOCUMENTS

| | | | |
|---|---|---|---|
| 3,636,274 | 1/1972 | Bratka . | |
| 4,117,523 | 9/1978 | Masuda et al. . | |
| 4,384,252 | 5/1983 | Kolter | 324/207.22 X |
| 4,680,543 | 7/1987 | Kohen | 324/173 X |
| 4,721,864 | 1/1988 | Goossens | 324/174 X |
| 4,746,791 | 5/1988 | Forkel | 324/174 X |
| 4,847,557 | 7/1989 | Saito et al. | 324/173 X |
| 4,910,459 | 3/1990 | Odagawa et al. | 324/207.13 |
| 5,069,221 | 12/1991 | Smith et al. | 324/207.2 X |
| 5,157,245 | 10/1992 | Shigeno et al. . | |
| 5,229,715 | 7/1993 | Niino et al. | 324/207.15 |
| 5,278,496 | 1/1994 | Dickmeyer et al. | 324/174 |
| 5,341,117 | 8/1994 | Singbartl | 324/173 X |

FOREIGN PATENT DOCUMENTS

| 4-74929 | 3/1992 | Japan | 324/174 |
|---|---|---|---|

*Primary Examiner*—Gerard R. Strecker
*Attorney, Agent, or Firm*—St. Onge Steward Johnston & Reens

[57] ABSTRACT

A magnetic sensor is provided having a pole piece, a housing for receiving and containing the pole piece, a sensing magnet and a cap for mounting the sensing magnet within the housing while retaining cracked magnet portions and either absorbing forces applied by the housing or distributing them over an entire surface of said magnet. In another aspect the invention provides a cap for mounting a sensing magnet in a magnetic sensor housing.

6 Claims, 2 Drawing Sheets

MAGNETIC SENSOR WITH PROTECTIVE CAP

FIELD OF THE INVENTION

The invention relates to magnetic sensors, and more specifically, to an enclosure for mounting a sensing magnet within a magnetic sensor.

BACKGROUND OF THE INVENTION

Magnetic sensors are used for a variety of applications to sense motion, position, and/or speed. Common applications for magnetic sensors in vehicles are engine controls and Anti-Lock Braking Systems (ABS). In both cases, magnetic sensors are placed in close proximity to a toothed disc or the like for measuring vehicle wheel speed. It is desirable to position the sensing magnet as closely as possible to the disc for maximum sensor performance.

U.S. Pat. No. 5,278,496 to Dickmeyer discloses a magnetic sensor design illustrated herein in prior art FIG. 3. This design includes an opening in the outer shell or casing which exposes an outer surface of the sensing magnet. In designs of this type, the magnet is mounted within the shell or casing by molding shell/casing material around sides of the magnet to hold it in place transversely and by overmolding a portion of the exposed magnet surface with shell/casing material to hold it in place axially. In this regard and with reference to prior art FIG. 3, edges of the magnet are typically provided with a radius and the overmolded shell/casing material grips this radius to press an inner surface of the magnet against the sensor pole piece and secure it within the sensor. The radius is generally provided by tumbling the magnets prior to assembling them—a practice which not only increases their production cost, but also results in some wastage.

A disadvantage of this design is that the shell/casing applies compressive/bending forces to the magnet which may cause it to crack and portions to dislodge from the sensor, degrading performance and possibly requiring replacement. These forces may be magnified by the vibration or shock of sensor distribution or of the vehicle environment, or by thermal expansion and contraction of the housing. All of these problems are exacerbated by the use of rare earth metal magnets which provide high performance and light weight but tend to be brittle and thus are easily cracked or chipped.

In other prior art designs, the sensing magnet is completely enclosed by the sensor shell/casing material which is typically plastic. Plastic is the material of choice for the outer housing because of its durability, low cost, ease of forming and imperviousness to environmental effects. One such design is disclosed in U.S. Pat. No. 5,431,117 to Singbartl illustrated herein in prior art FIG. 4. This design provides some protection against magnet cracking, however, the plastic overcoating deleteriously affects performance of the sensor.

What is desired, therefore, is a magnetic sensor in which the sensing magnet is mounted in such a way so as to limit destructive compressive forces while retaining any magnet chips and obtaining a high level of performance.

SUMMARY OF THE INVENTION

Accordingly, it is an object of the invention to provide a magnetic sensor which reduces the destructive forces applied to the sensing magnet by the housing and pole piece.

Another object of the invention is to provide a magnetic sensor of the above character in which forces are applied by the housing to a cap which fits over the sensing magnet outer surface and distributes the forces over an entire outer surface of the sensing magnet.

A further object of the invention is to provide a magnetic sensor of the above character in which the housing applies forces to sides of the cap.

Yet a further object of the invention is to provide a magnetic sensor of the above character in which sides of the cap include a flange for engaging the sensor housing.

Still another object of the invention is to provide a magnetic sensor of the above character in which the cap is formed from non-magnetic metal.

These and other objects are achieved by provision of a magnetic sensor having a pole piece, a housing for receiving and containing the pole piece, a sensing magnet and a cap for mounting the sensing magnet within the housing while retaining cracked magnet portions and either absorbing forces applied by the housing or distributing them over an entire surface of said magnet. Preferably, the sensing magnet is formed from a rare earth metal and thus the cap aids to minimize magnet cracking.

In another aspect the invention provides a cap for mounting a sensing magnet in a magnetic sensor housing. Most preferably, the cap of the invention is used in the sensor of the invention. The cap includes a bottom wall, a side wall extending from a periphery of the bottom wall to form a magnet-receiving cavity, and a flange on the side wall for interlocking with the housing. Preferably, the cap is formed from non-magnetic metal, most preferably brass, to minimize its affect on sensor performance. The side wall preferably diverges from the magnet as it extends from the bottom wall and is inwardly deflectable to absorb forces applied by the housing to aid in reducing magnet cracking.

The invention and its particular features and advantages will become more apparent from the following detailed description considered with reference to the accompanying drawings.

DETAILED DESCRIPTION OF THE INVENTION

Figure 1:
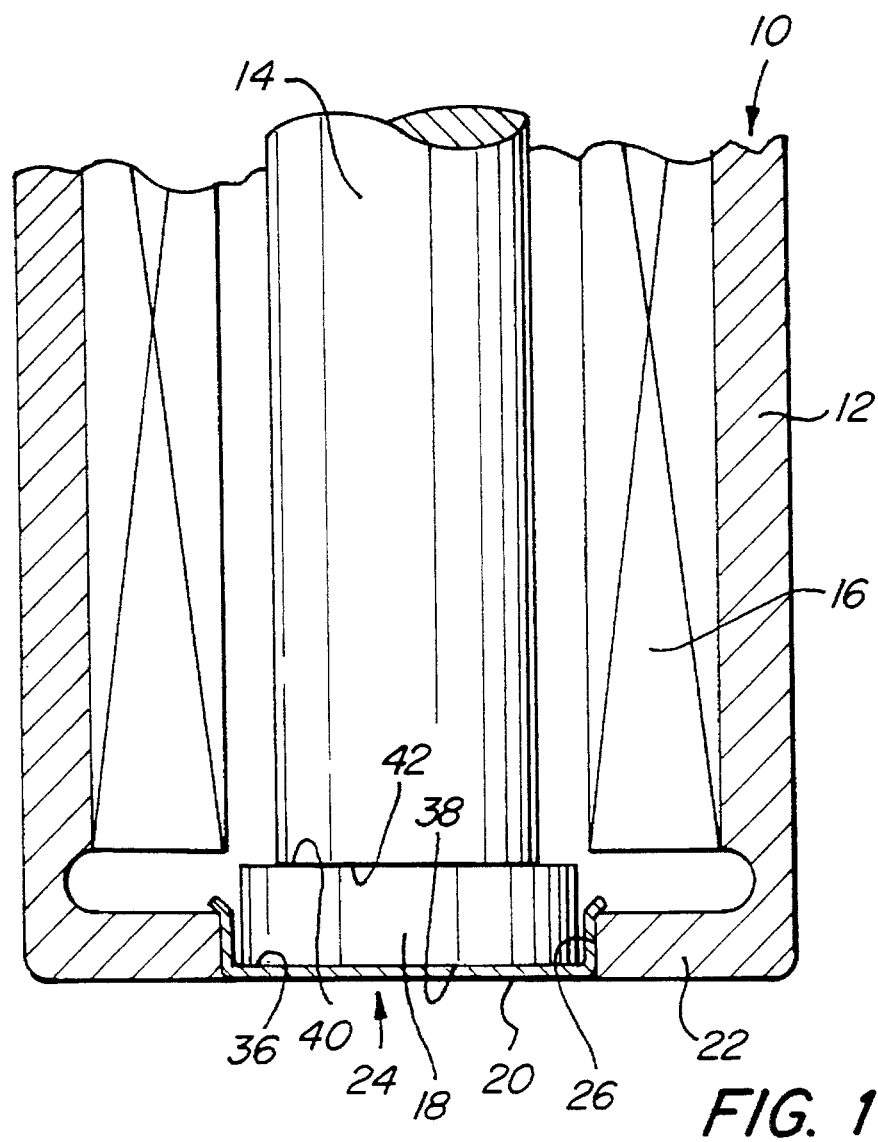
FIG. 1 is a side, cross-sectional view of a magnetic sensor constructed in accordance with the invention.
Figure 2:
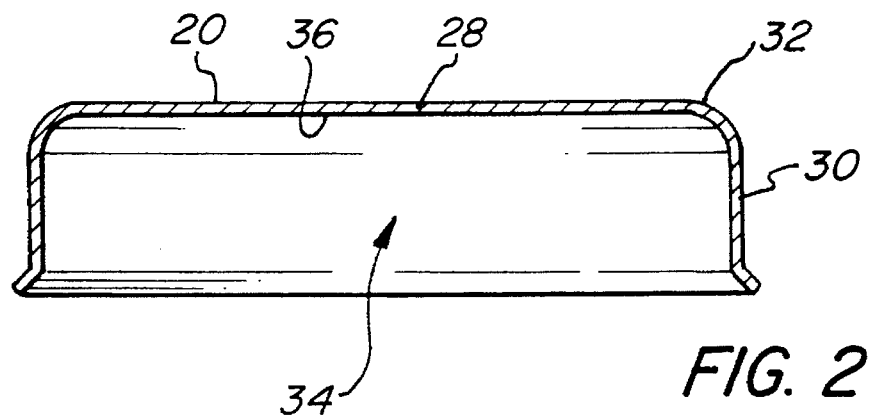
FIG. 2 is a side, cross-sectional view of a cap for assembling the magnetic sensor of FIG. 1.

Referring to FIGS. 1 and 2, magnetic sensor 10 in accordance with the invention includes a housing or shell 12, a pole piece 14, a coil 16, a sensing magnet 18, and a magnet cap 20 in accordance with the invention. Housing 12 receives and encloses pole piece 14 and coil 16. Sensing magnet 18 is mounted in housing 12 with magnet cap 20. In this regard, housing 12 has an end wall 22 including a hole or opening 24 defined by a rim 26. Magnet cap 20 fits in interlocking engagement with opening 26 of housing 12 to mount sensing magnet 18 within magnetic sensor 10.

Sensing magnet 18 is formed from a rare earth metal for applications such as engine timing and ABS wheel speed sensing. Suitable rare earth metal magnets include: Samarium Cobalt and Neodymium Iron Boron. Rare earth metal magnets are somewhat brittle and prone to cracking. Cracking or chipping may deleteriously affect sensor performance.

Figure 3:
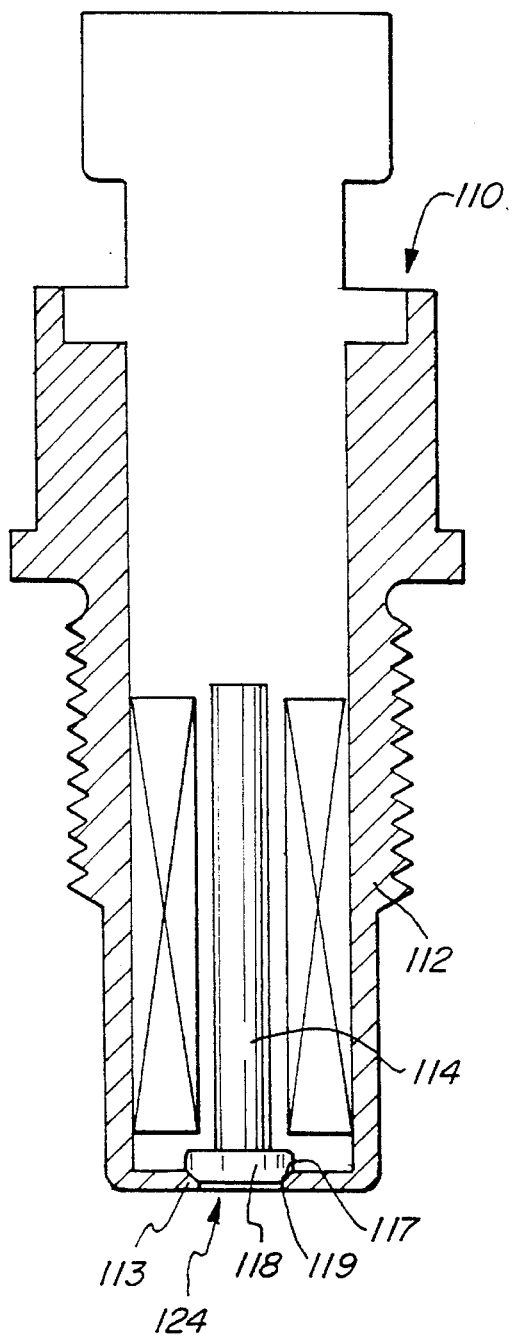
FIG. 3 is a side, cross-sectional view of a prior art magnetic sensor substantially in accordance with U.S. Pat. No. 5,278,496 and having an exposed sensing magnet subjected to destructive compression and bending forces.
Figure 4:
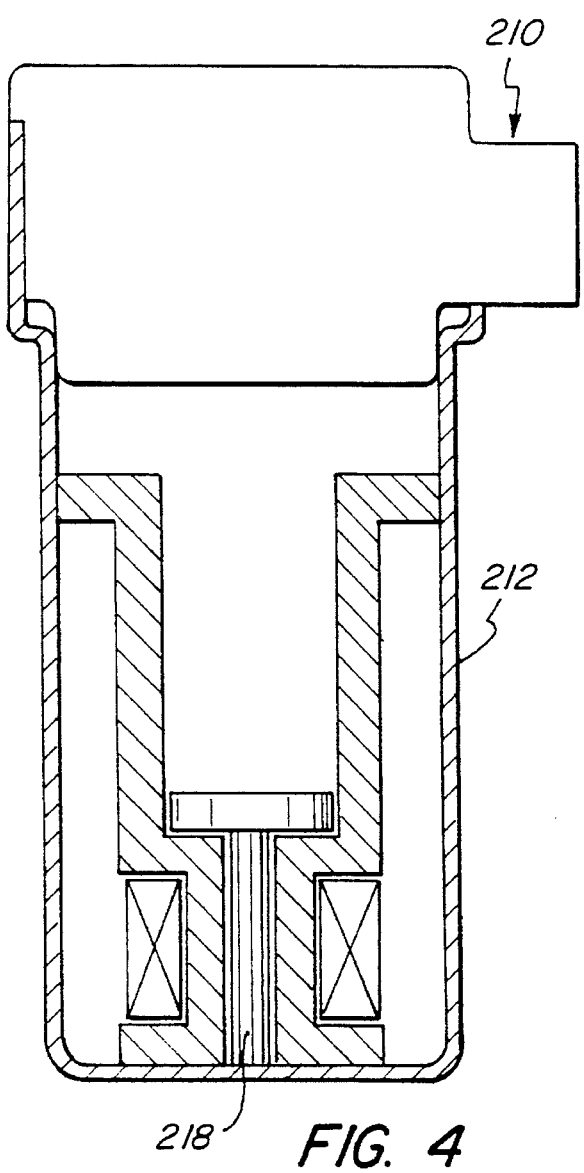
FIG. 4 is a side, cross-sectional view of a prior art magnetic sensor substantially in accordance with U.S. Pat. No. 5,341,117 and having a completely encased or overcoated sensing magnet of reduced performance.

Referring now to FIGS. 3 and 4, prior art magnetic sensors 110, 210 mount sensing magnets 118, 218 in several different ways. In sensor 110, housing 112 is molded over a periphery 119 of sensing magnet 118 to hold it in place. Thus, although housing 112 includes an opening 124, this opening is of a diameter smaller than a diameter of magnet 118. Further, to bring magnet 118 as close as possible to an outer surface of sensor 112—thereby advantageously reducing a gap between the magnet and item (not shown) being sensed—magnets 118 are often tumbled to provide a radius 117 to their edges. In this regard, the overmolded portion 113 of housing 112 flows around radius 117 to hold the magnet in place without overmolding either a substantial portion of periphery 119 or with a substantial thickness of housing material. Especially in the case of rare earth metal magnets, however, tumbling results in wastage due to cracking and breaking.

A disadvantage of the sensor 110 construction is that chips of magnet 118 may fall therefrom through hole 124 reducing performance and/or damaging the machinery or item being sensed. This disadvantage is exacerbated by the fact that overmolded portion 113 of housing 112 may provide a compressive force to magnet 118 at its periphery tending to bend or crack the magnet over central pole piece 114 which may act as a fulcrum. In some cases, magnet 118 may be visibly cracked and chipped during shipment and the sensors are thus rejected as defective before they are even installed.

In sensor 210, magnet 218 is completely encased by housing 212 which prevents the release of magnet chips, however, due to its large size and thickness the encasing material necessarily affects sensor performance requiring use of either a larger magnet or more complex analysis circuitry due to the lower strength/lower resolution signal generated.

Referring now to FIGS. 1 and 2, magnetic sensor 10 of the invention mounts sensing magnet 18 with magnet cap 20 in such a way so as to prevent release of magnet chips while also minimizing destructive forces applied to the magnet, minimizing the effect of the housing on sensor performance, and eliminating the need to either tumble the magnet or provide more complex analysis circuitry.

Magnet cap 20 includes a bottom wall 28 and a side wall 30 extending from a periphery 32 of bottom wall 28 to form a cavity 34 for receiving sensing magnet 18 therein (see FIG. 1). As assembled, an inner surface 36 of magnet cap 20 contacts an outer surface of 38 of sensing magnet 18. Magnet 18 is held in position within cap 20 by contact between an inner surface 40 of sensing magnet 18 and an end 42 of pole piece 14.

Bottom wall 28 of magnet cap 20 is sized to either match or be slightly larger than sensing magnet 18 such that rim 26 of housing opening 24 applies no direct forces to magnet 20. In this regard cap side wall 30 preferably slightly diverges from a sidewall 43 of magnet 18 as wall 30 extends from cap bottom wall 28. Thus, changes due to temperature and the like in the length or width of sensor housing 12 will be absorbed by side wall 30 and not directly transmitted to magnet 18 where they might cause breakage. It is understood, that a similar result could be obtained by providing cap bottom wall 28 with a slightly larger diameter than sensing magnet 18 instead of providing cap side walls 30 as diverging from bottom wall 28.

Cap side wall 30 includes a flange 44 which flares outwardly to engage housing rim 26 as cap 20 is inserted within housing opening 24. Flange 44 thereby interlocks with housing 12 to securely mount magnet 18 within sensor 10 without applying significant bending/cracking pressure to magnet 18. Forces applied by housing 12 to cap 20 tending to press magnet 18 into pole piece end 42 are distributed over the entire outer surface 38 of magnet 18. Further, any chips or cracks in magnet 18 will not significantly affect sensor 10 performance since they will be retained by cap 20 within cavity 34.

Cap 20 is formed from a non-magnetic metal, preferably brass due to its high corrosion resistance. To minimize any interference with sensing magnet 18, the brass material used to form cap 20 is only about 0.005 inches thick.

Also, the edges of magnet 18 need not be radiused to be mounted within sensor 10 by cap 20, eliminating the tumbling step which is time consuming and leads to wastage.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A magnetic sensor comprising:
    a pole piece having an end;
    a sensing magnet having inner and outer surfaces and a side wall, the inner surface in contact with the end of said pole piece;
    a housing for receiving and containing said pole piece, said housing having a hole defined by a rim; and
    a non-magnetic metal cap having an inner surface for receiving an outer surface of said sensing magnet thereagainst to distribute forces applied by said housing over the entire outer surface of the sensing magnet and to retain cracked magnet portions, said cap having a wall extending from a periphery of said inner surface, said cap side wall received within said hole rim to mount said sensing magnet such that said cap side wall receives forces applied by said housing.

2. The magnetic sensor of claim 1 wherein said cap wall diverges from the side wall of said magnet.

3. The magnetic sensor of claim 2 wherein said sensing magnet is formed from a rare earth metal.

4. A magnetic sensor comprising:
    a housing having an end wall;
    an opening in said housing end wall defined by a rim;
    a cap having a bottom wall, a side wall extending from a periphery of said bottom wall to form a cavity, and a flange connected to said wall;
    a sensing magnet having first and second sides and received within said cap with said second side contacting said bottom wall of said cap; and
    a pole piece having an end contacting said first side of said sensing magnet to retain said cap within said opening with said cap flange engaging said rim.

5. A magnetic sensor as in claim 4 wherein said cap is non-magnetic metal to minimize magnetic field interference.

6. The magnetic sensor of claim 5 wherein said sensing magnet is formed from a rare earth metal.

* * * * *